United States Patent [19]

Dawson

[11] 4,022,564
[45] May 10, 1977

[54] MOLDING APPARATUS UTILIZING PLANETARY GEAR ARRANGEMENT

[75] Inventor: John Dawson, Edgworth, England

[73] Assignee: Rototron Corporation, Farmingdale, N.Y.

[22] Filed: Mar. 14, 1975

[21] Appl. No.: 558,243

[52] U.S. Cl. .............................. 425/430; 425/434; 425/435; 74/802; 432/141
[51] Int. Cl.² ......................................... B29C 5/04
[58] Field of Search .......... 425/434, 435, 430, 429, 425/218, 260, 426; 164/83, 84, 86, 323, 324, 325, 326, 327, 328; 264/310, 311, 114; 74/750 R, 665 G, 665 GA; 269/61, 71; 432/134, 141; 259/54, 57, 58

[56] References Cited

UNITED STATES PATENTS

| 3,175,423 | 3/1965 | Adams | 74/802 |
| 3,676,037 | 7/1972 | Pivar | 425/435 |
| 3,700,228 | 10/1972 | Peale | 269/61 |

*Primary Examiner*—Robert L. Spicer, Jr.
*Attorney, Agent, or Firm*—Roberts & Cohen

[57] ABSTRACT

A molding apparatus which is provided with a frame including a bar acting as a mold support. The bar is pivoted between two angular limits and carries a gear wheel to be pivoted therewith. Planetary gears are engaged with the gear wheel and are displaced pivotally around the gear wheel to be rotated by the same. Molds are coupled to the planetary gears to be rotated therewith. Heating devices are located below the molds to heat the molds as they are being rotated simultaneously about their axes and about the axis of the gear wheel.

10 Claims, 3 Drawing Figures

MOLDING APPARATUS UTILIZING PLANETARY GEAR ARRANGEMENT

FIELD OF THE INVENTION

This invention relates to the formation of plastic articles by a rotary molding process in which thermoplastic material in particulate form is charged into a hollow mold which is heated and rotated to cause the plastic material to melt and form a coating over the inner surface of the mold.

BACKGROUND OF THE INVENTION

Various arrangements are known by which molds are rotated or pivoted simultaneously about a plurality of axes. For example, one such arrangemnet apears in U.S. Pat. No. 3,676,037 (S. Pivar) of July 11, 1972. This arrangement is satisfactory for numerous types of applications and may be regarded as one form of molding technique with which the instant invention is concerned.

Another form of molding apparatus appears, for example, in U.S. Pat. No. 3,151,196 (J. R. Tipton) of Sept. 29, 1964. This type of molding operation is restricted in use and does not possess the various features of the present invention as will become more apparent hereinafter.

SUMMARY OF INVENTION

An object of the present invention is to provide an improved machine and method which is suitable for use in the mass production of plastic articles by rotary molding but which is of simple and inexpensive construction.

According to the present invention, there is provided a machine, for use in rotary molding, comprising a plurality of rotatable mold supports, rotation means for simultaneously rotating said supports, and heating means for directly heating the molds when supported on said supports.

The direct heating means may comprise one or more heaters such as gas burners, infra-red heaters or the like which cause an envelope of heat to flow upwardly around the associated mold or molds.

The mold supports may be disposed in one or more clusters, each such cluster being disposed around and drivably connected to a common drive head.

Preferably each mold support is rotatable about at least two non-parallel axes to facilitate uniform coating of mold surfaces of various shapes.

BRIEF DESCRIPTION OF DRAWING

One embodiment of the invention will next be described by way of example only with reference to the accompanying drawing in which.

DETAILED DESCRIPTION

Figure 1:
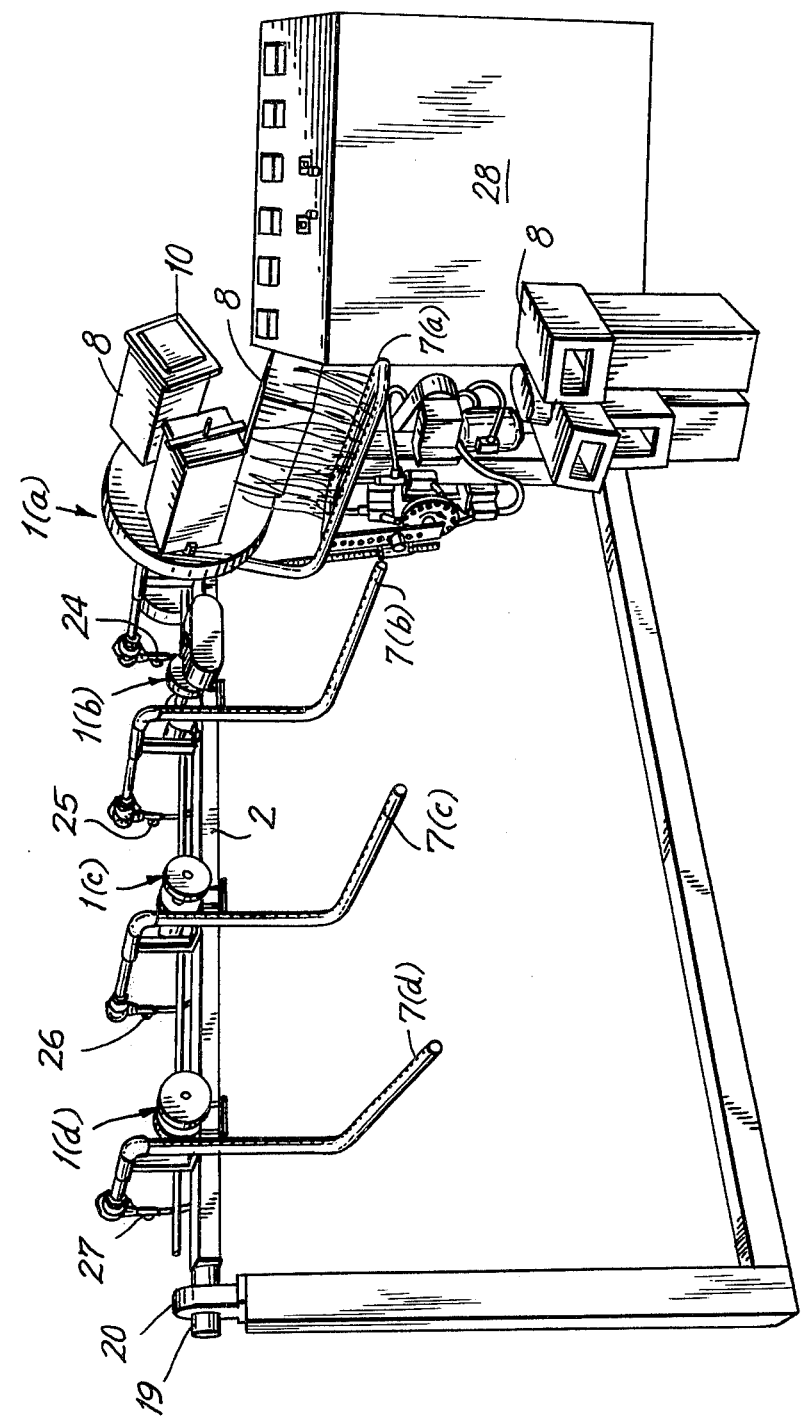
FIG. 1 is a front perspective view of one form of a machine according to the present invention.
Figure 2:
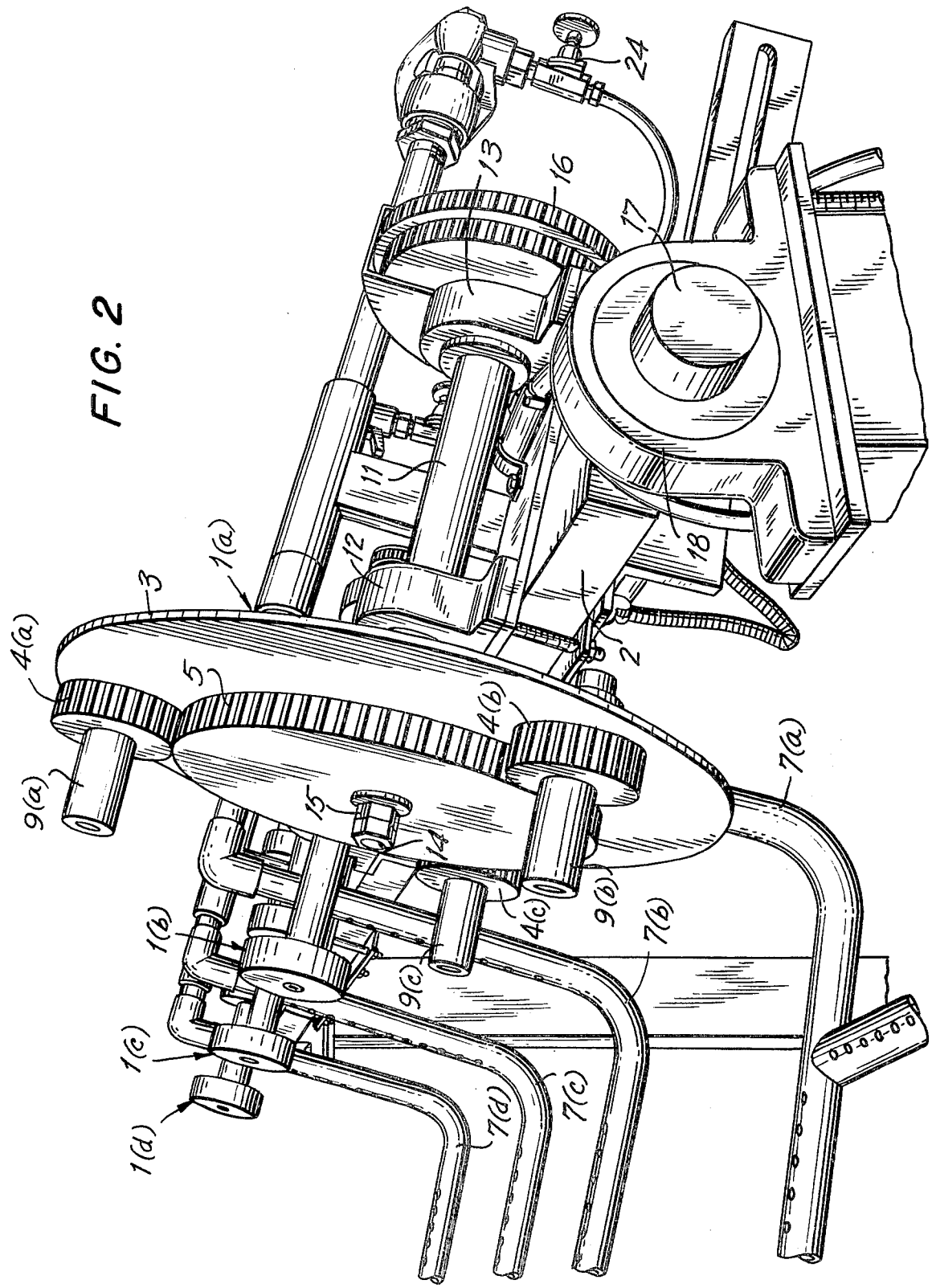
FIG. 2 is a side perspective view of the arrangement of FIG. 1 with the molds removed to expose the gear arrangement.
Figure 3:
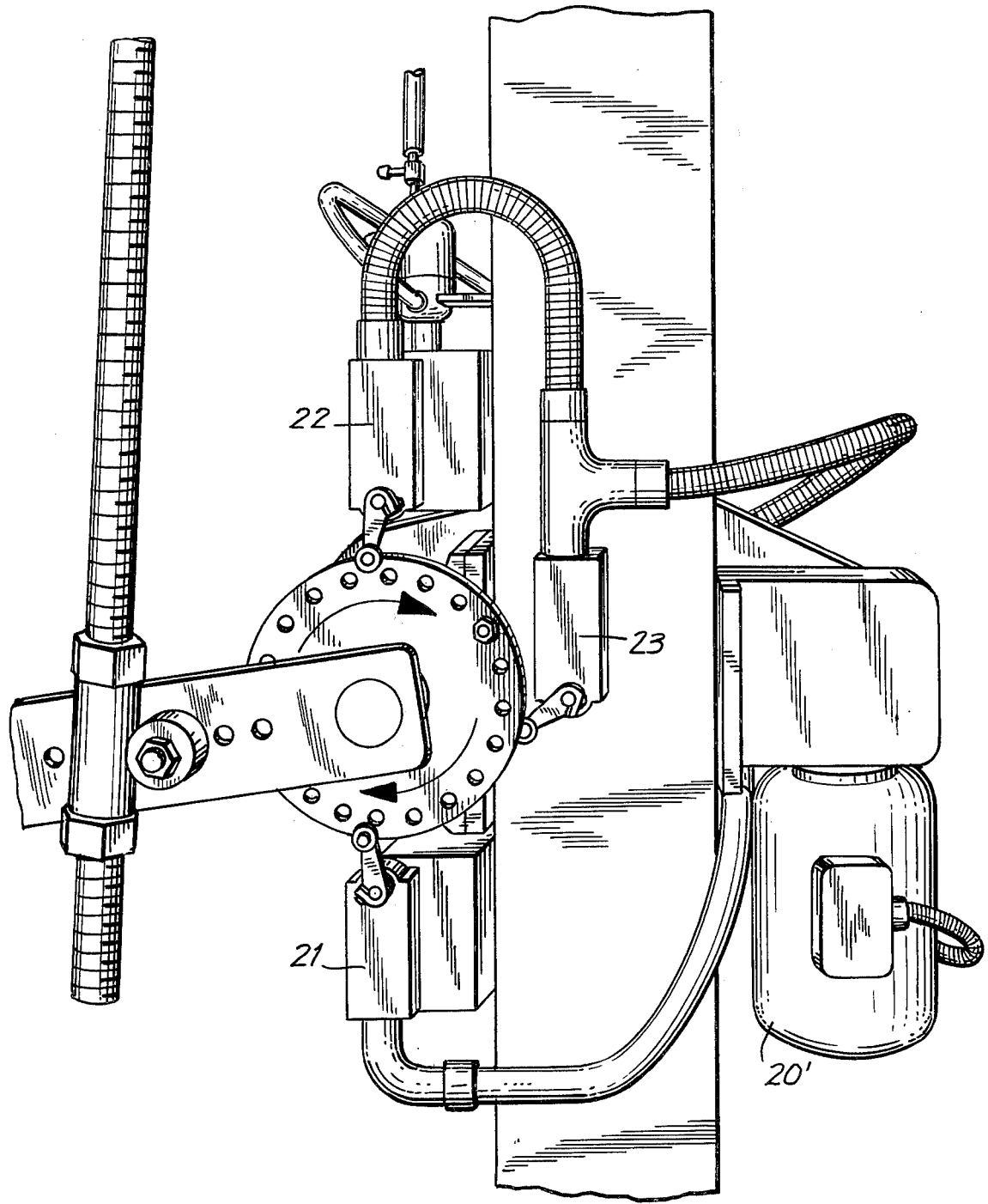
FIG. 3 illustrates a mold pivot control.

The machine of the invention comprises a plurality of like drive heads $1(a) - 1(d)$ mounted in side-by-side relation at equally spaced positions on a support beam or bar 2. Only one head $1(a)$ is shown in fully mounted condition.

The head $1(a)$, by way of example, comprises a disc 3 rotatably supporting three gear wheels $4(a) - 4(c)$ symmetrically disposed about and in mesh with a central larger gear wheel 5. The disc 3 is rotatable about its axis on a hollow shaft 11 relative to the beam 2 and relative to the central wheel 5. For this purpose shaft 11 is supported in bearings 12 and 13, the gear wheel 5 being supported on a rod 14 stationarily mounted with respect to beam 2 and engaged by nuts 15.

When the disc 3 is rotated, the wheels $4(a) - 4(c)$ rotate about the axis of the disc 3 and also simultaneously about their own axes. A drive means such as constituted by gears 16 is provided for effecting rotation of the disc 3.

The support beam 2 is mounted so as to be pivotable about its axis as defined by rod 17 in bushing 18 and rod 19 in bushing 20'. An appropriate drive means including electric motor 20 is provided for effecting such pivoting. An arrangement, for example incorporating limit swiches 21, 22 and 23 and clutches is provided for limiting the pivoting movement of the beam 2.

Beneath each drive head 1 and connected to the beam 2 so as to be movable therewith there is provided a respective gas burner $7(a) - 7(d)$. The burners may, for example, be of U-shape (burner $7(a)$) or they may be rectilinear (burners $7(b) - 7(d)$). They can be controlled through valves 24–27.

An automatic control device 28 is provided for controlling the supply of power to the drive means for rotating the disc 3 of each drive head and for pivoting the beam 2.

In use, for the mass production of molded plastic articles, for example rectangular open-topped containers, right parallelpiped molds 8 of appropriate internal shape are charged with thermoplastic powder and are mounted on the wheels 4 of the drive heads 1 by supports $9(a) - 9(c)$ so that the longitudinal axes of the molds 8 are aligned with the axes of the wheels 4. Mounting of molds 8 can be effected by threaded engagement or the like.

The gas-burners 7 are lit and the automatic control device actuated to cause the discs 3 of all drive heads 1 to rotate simultaneously for a predetermined period of time about a horizontal axis. As the discs 3 rotate, the molds 8 are caused to rotate in the flames of the gas burner 7 and the thermoplastic powder in the molds melts and runs over the inner surfaces of the molds to form coatings thereon. At a predetermined time during the molding operation, the control device independently of the rotational speed of the molds supplies power and causes the beam 2 to pivot through an angle so that the molds 8 move away from the position in which their axes are horizontal to a position at which their axes are inclined upwardly from the horizontal. In such position, the molten material coats the bottoms of the molds and the control device subsequently operates to return the molds to their horizontal positions after a predetermined period of time and reverses the direction of rotation of the molds to insure that the mold side and bottom surfaces are coated with a thin uniform layer of material. At the end of the molding operation, the molds are allowed to cool and the formed plastic articles are removed from the molds after removal of the detachable lids 10 from the molds.

The molds 8 are preferably readily detachable from the drive heads 1 so that, at the end of a molding operation, the molds can be removed and replaced with fresh molds thereby to facilitate speedy production of the molded articles. To further facilitate speedy production, the molds may be allowed to cool after removal from the machine.

The machine described above is of simple and inexpensive construction but can be used in a simple, efficient and speedy manner for the mass production of plastic articles. The drive heads or parts thereof are preferably detachable and interchangeable with other heads or parts so that the machine can be operated with a single rotatable support or with any other suitable number and arrangement of supports at each drive head in accordance with requirements.

The invention is not intended to be restricted to the details of the embodiment hereinbefore described and thus the various component parts of the machine may take any suitable form and may operate in any suitable manner. For example, by appropriate control of the movements of the molds, articles other than rectangular open-topped containers of uniform thickness may be formed. By varying the periods of time during which the molds are in their inclined and horizontal positions, the thickness of the bottoms of the articles can be adjusted. Further, the molds need not return to the horizontal positions but may return to positions slightly inclined to the horizontal to result in tapering side walls for the plastic articles. If desired, the molds may be tilted downwardly away from the horizontal to form totally enclosed articles.

What is claimed is:

1. Molding apparatus comprising a support, means coupled to said support to pivot the support between two angular limits, a gear wheel mounted on said support to be pivoted therewith, planetary gears mounted on said support and engaged with said gear wheel, means mounted on said support to displace said planetary gears around said gear wheel so that the planetary gears are rotated by the latter said gear wheel, molds coupled to said planetary gears to be rotated therewith, and heating means below the molds to heat the molds as the molds are being rotated simultaneously about their axes and the axis of the gear wheel.

2. Molding apparatus as claimed in claim 1 comprising further gear wheels, planetary gears, heating means and molds mounted as units at spaced positions along said support.

3. Molding apparatus as claimed in claim 1 wherein the first and second said means are independently operable so that the molds are rotated at a speed which is independent of the speed at which the support is pivoted.

4. Molding apparatus as claimed in claim 1 wherein the molds are right parallelepipeds.

5. Molding apparatus as claimed in claim 1 wherein the means to displace said planetary gears includes a rotatable disc on which the planetary gears are rotatably supported.

6. Molding apparatus as claimed in claim 2 comprising means for controlling the heating means separately at the respective positions.

7. Molding apparatus as claimed in claim 1, the first said means comprising an electric motor for pivoting said support and limit switches to limit the pivoting of said support.

8. Molding apparatus as claimed in claim 1 wherein the heating means is mounted on and pivots with said support.

9. Molding apparatus as claimed in claim 1 wherein said support is an elongated bar and the heating means is a generally Z - shaped structural member arranged transversely of said bar.

10. Molding apparatus as claimed in claim 1 wherein said axes of the molds are transverse with respect to said support.

* * * * *